(12) United States Patent
Kim

(10) Patent No.: US 8,556,012 B2
(45) Date of Patent: Oct. 15, 2013

(54) IN-WHEEL MOTOR VEHICLE

(75) Inventor: Myoung June Kim, Gyeonggi-do (KR)

(73) Assignee: Mando Corporation, Pyungteak-Si (KR)

( * ) Notice: Subject to any disclaimer, the term of this patent is extended or adjusted under 35 U.S.C. 154(b) by 518 days.

(21) Appl. No.: 12/615,160

(22) Filed: Nov. 9, 2009

(65) Prior Publication Data

US 2010/0116573 A1   May 13, 2010

(30) Foreign Application Priority Data

Nov. 10, 2008   (KR) .......................... 10-2008-110944

(51) Int. Cl.
*B60K 1/00* (2006.01)

(52) U.S. Cl.
USPC ....................................... 180/65.51

(58) Field of Classification Search
USPC ................. 180/65.51; 310/67 R, 67 A, 75 R; 303/152

See application file for complete search history.

(56) References Cited

U.S. PATENT DOCUMENTS

| | | | | |
|---|---|---|---|---|
| 3,022,649 A | * | 2/1962 | Roller | 180/383 |
| 3,566,165 A | * | 2/1971 | Lohr | 310/67 R |
| 4,330,045 A | * | 5/1982 | Myers | 180/65.51 |
| 4,913,258 A | * | 4/1990 | Sakurai et al. | 180/65.51 |
| 5,289,905 A | * | 3/1994 | Braschler | 180/65.51 |
| 5,412,269 A | * | 5/1995 | Couture | 310/67 R |
| 5,691,584 A | * | 11/1997 | Toida et al. | 310/67 R |
| 5,982,063 A | * | 11/1999 | Lutz et al. | 310/77 |
| 7,398,846 B2 | * | 7/2008 | Young et al. | 180/65.51 |
| 7,530,416 B2 | * | 5/2009 | Suzuki | 180/65.51 |
| 7,533,747 B2 | * | 5/2009 | Heinen | 180/65.51 |
| 7,717,203 B2 | * | 5/2010 | Yoshino et al. | 180/65.51 |
| 7,726,426 B2 | * | 6/2010 | Beck et al. | 180/65.8 |
| 8,002,060 B2 | * | 8/2011 | Komatsu | 180/65.51 |
| 2007/0257570 A1 | * | 11/2007 | Walter et al. | 180/65.6 |

FOREIGN PATENT DOCUMENTS

| | | |
|---|---|---|
| DE | 20 2008 006 887 U1 | 9/2009 |
| JP | 63162327 | 7/1988 |
| JP | 2007-253686 | 10/2007 |
| JP | 2007-283987 | 11/2007 |
| KR | 10-2004-0021703 A | 3/2004 |

OTHER PUBLICATIONS

German Office Action, w/ partial English translation thereof, issued in German Patent Application No. 10 2009 052 470.3-21 dated Jan. 24, 2011.

* cited by examiner

*Primary Examiner* — J. Allen Shriver, II
*Assistant Examiner* — James M Dolak
(74) *Attorney, Agent, or Firm* — McDermott Will & Emery LLP

(57) ABSTRACT

Disclosed herein is an in-wheel motor vehicle to increase design freedom of an electric motor mounted in a wheel, dynamic performance of the vehicle, and cooling performance of a brake device. The in-wheel motor vehicle includes a wheel rotatably mounted to a vehicle body, an electric motor mounted in the wheel to drive the wheel, an axle extending from the wheel to the vehicle body so as to be rotated together with the wheel, and a brake device mounted to the vehicle body at a position spaced apart from the wheel for braking of the axle.

8 Claims, 2 Drawing Sheets

IN-WHEEL MOTOR VEHICLE

CROSS-REFERENCE TO RELATED APPLICATION

This application claims the benefit of Korean Patent Application No. 2008-0110944, filed on Nov. 10, 2008 in the Korean Intellectual Property Office, the disclosure of which is incorporated herein by reference.

BACKGROUND

1. Field

Embodiments of the present invention relate to an in-wheel motor vehicle having improved installation of a brake device.

2. Description of the Related Art

Vehicles, which employ an internal combustion engine as a power source, may contain a great number of constituent elements, such as an engine, transmission, drive shaft, hydraulic brake system, fuel supply device, suction and exhaust devices, cooling and lubricating devices, etc., and may cause air pollution due to exhaust fumes.

Recently, vehicles using an electric motor as a power source have been actively studied to develop environmentally friendly vehicles. In one example, Korean Patent Laid-open Publication No. 2004-0021702 discloses a vehicle in which an electric motor is mounted in a wheel.

However, this kind of vehicle in which the electric motor to generate drive power is mounted inside the wheel has a limit in the shape and size of the electric motor because a speed reducer and a brake device may additionally be installed in a narrow space inside the wheel. The vehicle has difficulty incorporating a high-capacity electric motor due to the limited interior space of the wheel and therefore, has difficulty realizing sufficient drive output. Furthermore, increased load may act on a suspension due to a heavy weight of the wheel thus deteriorating vehicle dynamic performance, and poor air flow around the brake device makes it difficult to discharge heat generated during braking.

SUMMARY

Therefore, it is an aspect of the present invention to provide an in-wheel motor vehicle to increase design freedom of an electric motor mounted in a wheel, dynamic performance of the vehicle, and cooling performance of a brake device.

Additional aspects of the invention will be set forth in part in the description which follows and, in part, will be obvious from the description, or may be learned by practice of embodiments of the invention.

In accordance with one aspect of the present invention, in an in-wheel motor vehicle having a wheel rotatably mounted to a vehicle body and an electric motor mounted in the wheel to drive the wheel, the vehicle further includes an axle extending from the wheel to the vehicle body so as to be rotated together with the wheel, and a brake device mounted to the vehicle body at a position spaced apart from the wheel for braking of the axle.

The brake device may be a disc brake and may include a disc-shaped rotor connected to the axle and rotatably supported by a supporting shaft of the vehicle body, and a press member to brake the rotor by pressing an outer surface of the rotor.

The brake device may be a drum brake and may include a drum-shaped rotor connected to the axle and rotatably supported by a supporting shaft of the vehicle body and a press member to brake the rotor by pressing an inner surface of the rotor.

The supporting shaft may be fixed to the vehicle body, and the rotor may be rotatably supported by the supporting shaft with a bearing interposed therebetween.

The axle may include at least one refraction connector.

BRIEF DESCRIPTION OF THE DRAWINGS

These and/or other aspects of the present invention will become apparent and more readily appreciated from the following description of the embodiments, taken in conjunction with the accompanying drawings of which.

DETAILED DESCRIPTION

Figure 1:
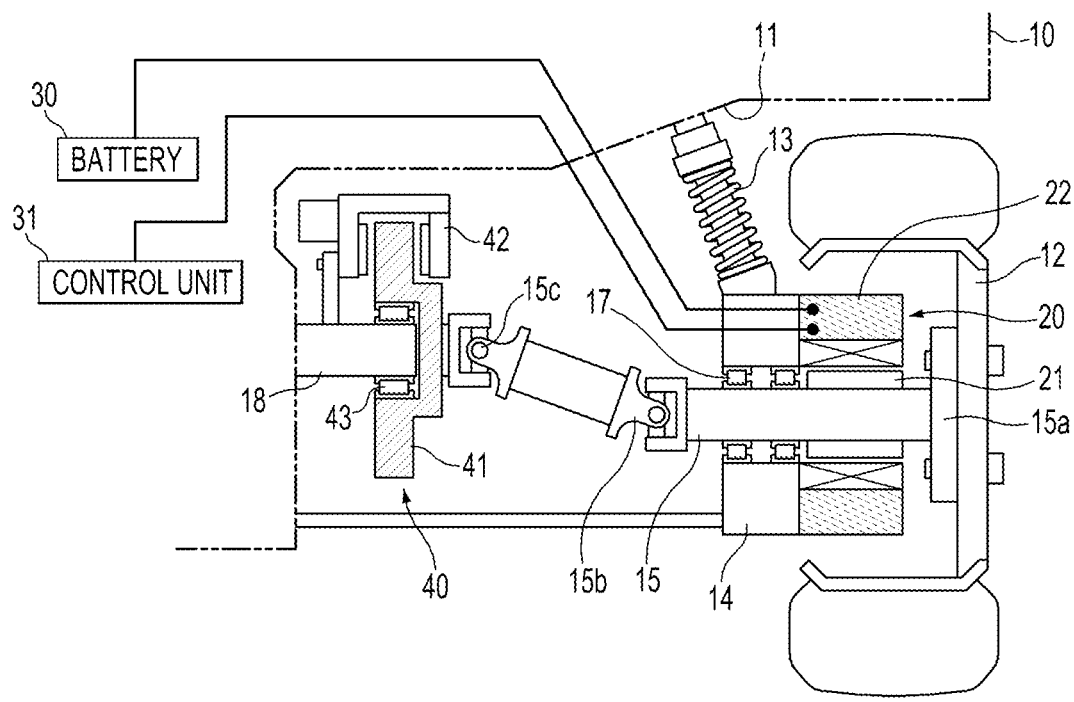
FIG. 1 is a sectional view illustrating installation of an in-wheel motor and a brake device of a vehicle according to an embodiment of the present invention.

Reference will now be made in detail to the embodiments of the present invention, examples of which are illustrated in the accompanying drawings, wherein like reference numerals refer to like elements throughout.

A vehicle according to the embodiments of the present invention is designed such that an electric motor is mounted in each of four wheels, enabling independent driving of each wheel. FIG. 1 illustrates an example wherein an electric motor is mounted in any one of wheels.

As shown in FIG. 1, a suspension 13 to support a wheel 12 in a shock-absorbing manner is mounted in a wheel house 11 of a vehicle body 10. The suspension 13 is provided with a knuckle 14 to rotatably support an axle 15 connected to the wheel 12. The wheel 12 is mounted to a disc-shaped wheel coupler 15a provided at an end of the axle 15. The axle 15 is supported by the knuckle 14 with a bearing 17 interposed therebetween. With this configuration, the axle 15 is rotated simultaneously with rotation of the wheel 12.

An electric motor 20 is mounted in the wheel 12 to rotate the axle 15 for driving of the wheel 12. The electric motor 20 includes a rotor 21 coupled to an outer surface of the axle 15, and a stator 22 arranged around the rotor 21 and coupled to the knuckle 14. The stator 22 takes the form of a coil winding, and is excited upon receiving power from a battery 30 to rotate the rotor 21 coupled to the axle 15. Although the embodiment illustrates the rotor 21 of the electric motor 20 directly coupled to the axle 15, an electric motor integrated with a speed reducer (not shown) may be configured such that an output end of the speed reducer is connected to the axle 15. A control unit 31 to control the electric motor 20 is provided to control supply of electric power to the electric motor 20 during traveling of the vehicle and to perform regenerative braking. Electric energy produced by regenerative braking is stored in the battery 30 after being adjusted to a charge voltage.

A brake device 40 to brake the wheel 12 is spaced apart from the wheel 12. The brake device 40 is mounted in the wheel house 11 at a position inward than the knuckle 14 while being coupled to the vehicle body 10. The axle 15 connected to the wheel 12 extends toward the brake device 40 (toward the vehicle body) and is connected to the brake device 40. That is, the brake device 40 spaced apart from the wheel 12 brakes the wheel 12 by braking the axle 15.

The brake device 40 includes a rotor 41 rotatably coupled to a supporting shaft 18 of the vehicle body 10, and a press member 40 to press the rotor 41 for frictional braking. The rotor 41 is rotatably coupled to an outer surface of the supporting shaft 18 with a bearing 43 interposed therebetween, and the axle 15 is connected to the center of the rotor 41. The axle 15 to connect the rotor 41 and the wheel 12 to each other includes two refraction connectors 15b and 15c in the form of universal joints. With this configuration, rotation force of the wheel 12 may be smoothly transmitted to the rotor 41 of the brake device 40 via the axle 15 even if the vehicle body 10 is moved vertically during traveling of the vehicle.

Figure 2:
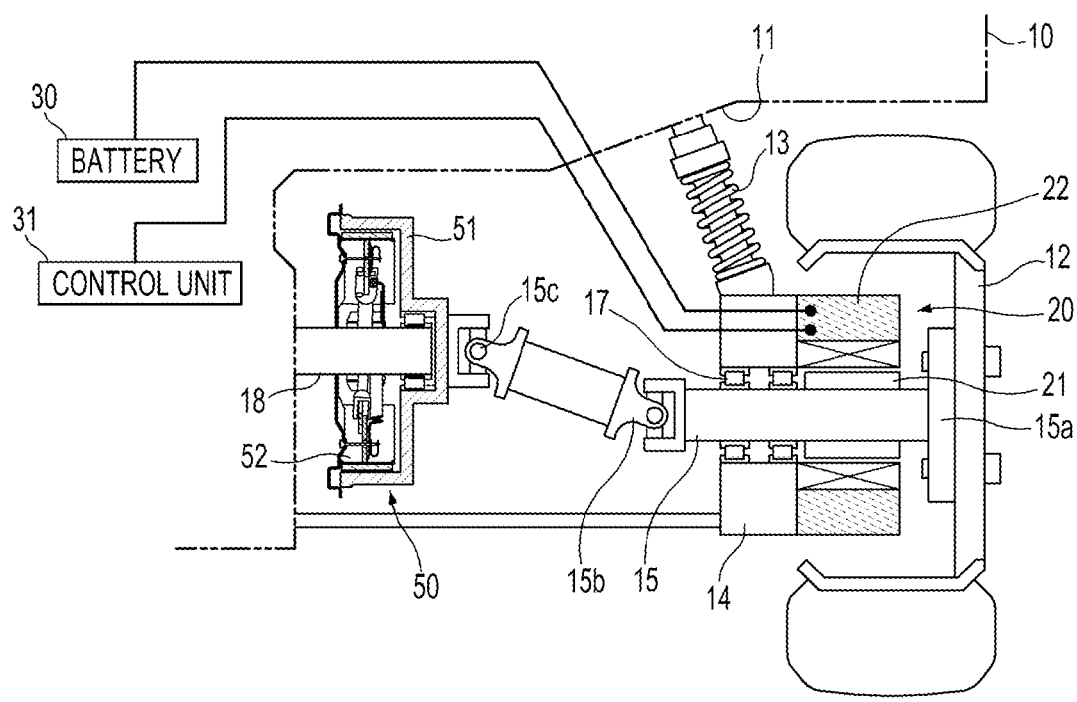
FIG. 2 is a sectional view illustrating installation of an in-wheel motor and a brake device of a vehicle according to another embodiment of the present invention.

The embodiment of FIG. 1 illustrates the brake device 40 of a caliper type disc brake including the disc-shaped rotor 41 and the press member 42 to press opposite sides of an outer surface of the rotor 41 using frictional pads, whereas the embodiment of FIG. 2 illustrates a brake device 50 of a drum brake including a drum-shaped rotor 51 and a press member 52 to brake the rotor 51 by pressing an inner surface of the rotor 51. These brake devices may use hydraulic, pneumatic, or electric driven type press members 42 and 52 to press the rotors 41 and 51. Configurations and operation principles of the press members of the disk brake or the drum brake are well known and thus, a detailed description thereof will be omitted herein.

In operation of the brake device 40, if the wheel 12 is rotated by operation of the electric motor 20, the rotor 41 connected to the wheel 12 via the axle 15 is rotated. Braking of the axle 15 is accomplished as the press member 42 of the brake device 40 brakes the rotor 41 and accordingly, braking of the wheel 12 is accomplished.

In the above described vehicle, since the brake device 40 is connected to the wheel 12 via the axle 15 while being spaced apart from the wheel 12, the electric motor 20 mounted in the wheel 12 has increased design freedom. Specifically, an extra space within the wheel 12, obtained because the brake device is not mounted inside the wheel 12 differently from the related art, may provide the electric motor 20 with shape diversity and increased size. Accordingly, the above described vehicle may employ a high-capacity electric motor 20.

Furthermore, since the brake device 40 is supported by the vehicle body 10, load applied to the suspension 13 may be lower than in the related art, resulting in increased vehicle dynamic performance. In addition, the brake device 40 is exposed to air flowing below the vehicle, having enhanced cooling performance.

As is apparent from the above description, an in-wheel motor vehicle is configured such that a brake device is connected to a wheel via an axle while being spaced apart from the wheel, assuring increased design freedom of an electric motor. Specifically, an extra space created in the wheel provides shape diversity and increased size of the electric motor.

Further, a brake device is supported by a vehicle body, applying reduced load to a suspension as compared to the related art and consequently, increasing vehicle dynamic performance.

Furthermore, the brake device may be easily supported by air flowing under a vehicle, thereby enhancing cooling performance.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An in-wheel motor vehicle having a wheel rotatably mounted to a vehicle body and an electric motor mounted in the wheel to drive the wheel, the vehicle further comprising:
   an axle extending from the wheel to the vehicle body so as to rotate together with the wheel; and
   a brake device mounted to the vehicle body at a position spaced apart from the wheel for braking of the axle,
   wherein the electric motor is arranged to surround at least a portion of the axle.

2. The vehicle according to claim 1, wherein the brake device is a disc brake and includes a disc-shaped rotor connected to the axle and rotatably supported by a supporting shaft of the vehicle body, and a press member to brake the disc-shaped rotor by pressing an outer surface of the disc-shaped rotor.

3. The vehicle according to claim 2, wherein the supporting shaft is fixed to the vehicle body, and the disc-shaped rotor is rotatably supported by the supporting shaft with a bearing interposed there between.

4. The vehicle according to claim 1, wherein the brake device is a drum brake and includes a drum-shaped rotor connected to the axle and rotatably supported by a supporting shaft of the vehicle body and a press member to brake the rotor by pressing an inner surface of the rotor.

5. The vehicle according to claim 4, wherein the supporting shaft is fixed to the vehicle body, and the rotor is rotatably supported by the supporting shaft with a bearing interposed there between.

6. The vehicle according to claim 1, further including at least one refraction connector connecting the axle with the brake device to transmit a rotation force of the wheel to the brake device.

7. The vehicle according to claim 1, wherein the electric motor includes:
   a rotor coupled to the outer surface of the axle; and
   a stator arranged around the rotor.

8. The vehicle according to claim 1, further comprising:
   a bearing disposed on the outer surface of the axle; and
   a knuckle coupled to the outer surface of the axle with the bearing interposed between the knuckle and the axle.

* * * * *